United States Patent [19]
Porte et al.

[11] Patent Number: 5,716,668
[45] Date of Patent: Feb. 10, 1998

[54] METHOD FOR THE PRODUCTION OF A SILICONE-BASED FIREPROOF PROTECTION MEANS

[75] Inventors: Alain Porte, Colomiers; François Cros, Toulouse; Jean-Marc Martinou, L'Union, all of France

[73] Assignees: Aerospatiale Societe Nationale Industrielle, Paris; Tecalemit Flexibles, Blois, both of France

[21] Appl. No.: 657,047

[22] Filed: May 29, 1996

Related U.S. Application Data

[62] Division of Ser. No. 358,713, Dec. 19, 1994, Pat. No. 5,571,625.

[30] Foreign Application Priority Data

Dec. 20, 1993 [FR] France ................... 93 15287

[51] Int. Cl.[6] ........................................ B05D 3/12
[52] U.S. Cl. ................ 427/177; 156/195; 156/278; 156/307.3; 427/385.5; 427/407.1
[58] Field of Search ................ 427/177, 407.1, 427/385.5; 156/195, 278, 307.3

[56] References Cited

U.S. PATENT DOCUMENTS

| | | | |
|---|---|---|---|
| 3,117,597 | 1/1964 | Fritz et al. | 138/125 |
| 3,858,618 | 1/1975 | Kaufman | 138/149 |
| 4,190,088 | 2/1980 | Lalikos et al. | 138/126 |
| 4,675,221 | 6/1987 | Lalikos et al. | 428/36 |
| 4,714,650 | 12/1987 | Obayashi et al. | 428/265 |
| 4,961,989 | 10/1990 | Grimwood | 428/229 |
| 4,994,317 | 2/1991 | Dugan et al. | 428/246 |
| 5,292,575 | 3/1994 | Metivaud | 428/224 |

FOREIGN PATENT DOCUMENTS

| | | |
|---|---|---|
| 2348401 | 7/1974 | Germany. |
| 2453238 | 5/1976 | Germany. |
| 2905610 | 8/1980 | Germany. |
| 3942354 | 6/1991 | Germany. |

*Primary Examiner*—Bernard Pianalto
*Attorney, Agent, or Firm*—Fisher, Christen & Sabol

[57] ABSTRACT

Method for the production of a silicone-based fireproof protection means and protection means thus obtained.

According to the invention, the protection means include:
- an inner polymerized unfilled silicone coating (3) adhering to an object (2) to be protected; and
- a fire-resistant fibrous jacket (5) carried by said inner coating (3), without adhering to it.

Application to the protection of pipes, especially hydraulic pipes.

7 Claims, 1 Drawing Sheet

1

METHOD FOR THE PRODUCTION OF A SILICONE-BASED FIREPROOF PROTECTION MEANS

This is a divisional application of Ser. No. 08/358,713, filed on Dec. 19, 1994, U.S. Pat. No. 5,571,625.

The present invention relates to a method for the production of a silicone-based fireproof protection means, as well as the fireproof protection means obtained by the implementation of this method.

It is known that silicone has fire-resistant and heat-resistant properties. These properties have therefore been widely used for a long time for protection against fire. For example, it is known to produce prefabricated silicone jackets (sleeves, shells, etc.), which thereafter are placed over the objects to be protected, or else to use silicone paints with which said objects are coated.

However, under the action of a fire, the silicone has, long term, the drawback of becoming brittle, of cracking and of breaking up into pieces, so that pieces of said jackets or said coatings become detached from them, leaving bare and without protection from fire portions of the objects to be protected. This drawback is further aggravated when said objects to be protected are subjected to vibrations, which accelerate the separation of pieces of the protection means from the rest of it.

In order to try and remedy this drawback and to impart greater mechanical strength to the silicone-based fireproof protective jackets and coatings, it has already been considered to incorporate fibrous reinforcements within said protection means. Such reinforcements may be in the form of randomly distributed individual fibers or else in the form of organized fibers, for example a fabric. However, these fibrous reinforcements consist of fire-resistant fibers whose material (glass, ceramic, alumina, etc.) is different from silicone. As a result, under the action of fire, the fibers react in a different manner to that of the silicone (for example in terms of expansion) and form, within the protection means, passages for propagation of fire and of hot gases, so that said reinforcements, contrary to the general purpose for which they are provided (increase in the mechanical strength) can contribute and/or aggravate the fragmentation of said reinforcements subjected to a prolonged fire. In addition, in the case where the objects to be protected are subjected to vibrations, said reinforcements propagate said vibrations within the protection means and accelerate said fragmentation.

Moreover, it has already been tried to increase the fireproof properties of silicone by incorporating endothermic fillers therein. However, these endothermic fillers are somewhat intumescent so that, under the action of fire, the silicone undergoes a volume increase embrittling it and the increase in the fireproof resistance thus obtained is quite often counterbalanced by an increase in the brittleness of the protection means under the action of fire. In addition, such endothermic fillers generally incorporate a great deal of water, so that the result is the corrosion of the objects to be protected when these are made of metal.

In addition, it will be noted that the known fireproof protection means, in the form of paint, are easy to apply, even on finished objects. However, the thickness of the paint coating that can be obtained is generally insufficient to guarantee a satisfactory fireproof protection means. Fireproof paints can therefore provide only short-term protection from small-scale fires.

Conversely, the known fireproof protection means, in the form of prefabricated jackets, can have any desired thickness, but on the other hand they can be excessively heavy and bulky and they are often difficult to put into place on finished objects, especially when these are rigid pipes.

If the prefabricated protective jacket is in the form of a sleeve, which has to be slipped over the pipe and fixed thereto by means of attached tightening straps, this protective sleeve must have an internal diameter such that it is possible to slip it over the fittings and bends of the pipe. This implies that the internal diameter of the sleeve is greater than the external diameter of the pipe. The overall size of the pipe thus clad with the sleeve can pose installation problems. In addition, when the rigid pipe includes bends, which is often the case, it is difficult, nay impossible, to slip over said sleeve if the bends are very sharp.

Moreover, the sleeve precludes the installing of fixtures, using straps or combs, for fixing said pipe to walls.

Furthermore, on account of the fact that there is no adhesion of the protective sleeve to the surface of the pipe, the vibrations generate abrasion of the latter via the sleeve, this being deleterious to the fatigue strength of said pipe.

Likewise, when the prefabricated protective jacket is in the form of a longitudinally slit sleeve or else in the form of two half-shells, it cannot adhere to said pipe so that this results in abrasion of the pipe in the event of vibrations. In addition, such a jacket is then difficult to manufacture for pipes of complex shape or of varying cross section.

The object of the present invention is to remedy these drawbacks.

For this purpose, according to the invention, the method for the production of a silicone-based fireproof protection means is noteworthy in that:

a) an object to be protected is coated with an unfilled silicone elastomer, being in the form of a paste and adhering to said object;

b) the silicone elastomer, with which said object is thus coated, is at least partially polymerized; after which c) the at least partially polymerized silicone coating is coated with a fire-resistant fibrous jacket which does not adhere to said silicone coating.

Thus, in accordance with the present invention, the silicone-based fireproof protection means includes:

an inner polymerized unfilled silicone coating adhering to an object to be protected; and a fibrous, fire-resistant jacket carried by said inner coating but not adhering to it.

When the protection means in accordance with the present invention is subjected to the action of a flame, said fibrous jacket protects the silicone coating and holds, in its entirety, the silica cocoon formed by this silicone coating under the action of the temperature, preventing it from fragmenting.

In addition, it should be pointed out that:

since the silicone includes neither an endothermic filler nor an incorporated reinforcement, there is less of a tendency to fragment and there is no fear of corrosion of the protected object;

since the fibrous jacket does not adhere to the silicone coating, the latter can expand inside said fibrous jacket without causing mechanical stresses in said jacket;

since the silicone coating adheres to said object to be protected, there is no risk of abrasion of the latter by the silicone and the protection effectiveness is optimal, even with a small silicone thickness;

the fireproof protection means in accordance with the present invention can be easily produced on finished objects, irrespective of the geometrical shapes thereof;

the thickness of the fireproof protection means according to the invention, by virtue of the pasty nature of the elastomer, can be easily optimized as a function of the protection effectiveness desired; the same applies to the overall size and weight of said protection means;

the fireproof protection means of the invention can be produced on all or part of the object to be protected.

Said pasty silicone elastomer can be applied to the object to be protected in any appropriate manner. However, this elastomer is advantageously applied by spraying with a gun.

Preferably, the intended polymerization, after the application of the pasty silicone elastomer, is only partial and, after said fibrous jacket has been formed, complete polymerization of the silicone coating is carried out so as to impart to the latter its optimum mechanical properties.

The fibrous jacket, although it can be produced in any known way, is advantageously obtained by helically winding a braided sheet of fire-resistant fibers (glass, alumina, ceramic, etc.).

In order to hold said fibrous jacket in place and to obtain an outer surface which does not run the risk of abrading fixtures for fitting the object to a support, it may be advantageous for the protection means in accordance with the present invention to include, in addition, a polymerized unfilled silicone coating covering, at least partially, said fibrous jacket.

For this purpose, after producing the fibrous jacket, the latter is coated, at least partially, with an unfilled silicone elastomer, for example by spraying with a gun. In this case, the partial polymerization of the silicone covering the object to be protected is carried out before forming the fibrous jacket and then, after coating said fibrous jacket with an unfilled silicone elastomer, complete polymerization of the silicone coating covering said object and of the silicone coating covering said fibrous jacket is carried out.

BRIEF DESCRIPTION OF THE DRAWINGS

The figures of the appended drawing will explain clearly how the invention can be realized. In these figures, identical references designate similar elements.

Figure 1:
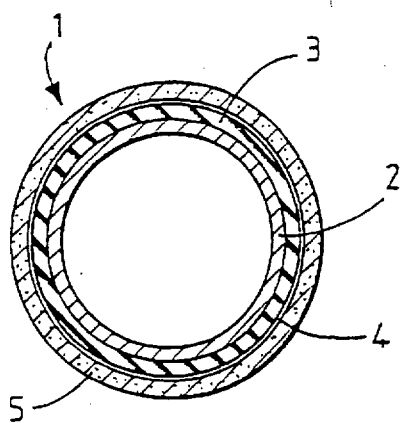
FIG. 1 is a view, in cross section, of a tube provided with a fireproof protection means in accordance with the present invention, said section corresponding to the line I—I of FIG. 3.

The protected tube 1, depicted in cross section in FIG. 1 and in accordance with the invention, includes a tube 2 to be protected (for example made of steel, especially stainless steel) and a fireproof protection means 3, 4, 5.

The tube 2 to be protected carries, on its external face, a silicone coating 3 which includes no endothermic filler and which does not adhere to said tube 2.

Figure 2:
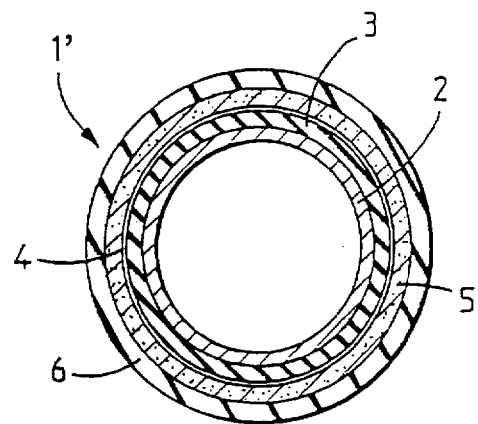
FIG. 2 illustrates, also in cross section, an embodiment variant of the fireproof protection means shown by FIG. 1.

The silicone coating 3 is covered with a jacket 5 of fire-resistant fibers. The fibrous jacket 5 is carried by the silicone coating 3, without adhering to it, this being depicted diagrammatically in FIGS. 1 and 2 by a clearance 4.

In order to produce the fire-proof protection means 3, 4, 5 in accordance with the present invention, the procedure is as follows:

a—The external surface of the tube 2 is coated with a silicone elastomer which includes no endothermic filler and is in a pasty form. This silicone elastomer may be the one known commercially by the reference RTV 141 of the Company RHONE-POULENC. It can be applied to the tube 2 in any appropriate manner; however, preferably, it is sprayed with the aid of a pneumatic gun. By reason of its pasty consistency, the silicone elastomer naturally adheres to the surface of the tube 2. However, optionally, in order to ensure adhesion of the silicone elastomer to the tube 2, it is possible to apply to the latter a bonding substance, such as a silicone-containing primer, before applying the silicone elastomer. The thickness of the silicone elastomer applied to the tube 2 is determined by the effectiveness of the thermal protection desired.

b—After obtaining the desired thickness for the silicone elastomer, cold polymerization of the latter is carried out so as to obtain the silicone coating 3 which adheres to said tube 2.

c—Next, the fibrous jacket 5 is produced on the silicone coating 3 thus partially polymerized. This fibrous jacket can be formed by winding, for example with touching turns, a sheet consisting of a fabric or a braid of glass fibers, ceramic fibers, alumina fibers, etc. The fibrous jacket 5 may consist of a plurality of superposed layers of such a wound sheet. The thickness of the fibrous jacket 5 is chosen as a function of the fire resistance desired. It will be noted that, by virtue of the cold polymerization of the silicone elastomer, prior to the winding of the sheet of fire-resistant fibers, said fibrous jacket does not adhere to the coating 2, as is illustrated diagrammatically by the clearance 4.

d—Finally, the tube 2 carrying the protection means 3, 4, 5 is put into an oven in order to carry out the final complete polymerization of the silicone in order to give the latter its optimum mechanical characteristics.

In order to test the fire resistance of the protection means in accordance with the present invention, the following comparative tests were carried out by means of four different test specimens.

The first test specimen was formed by a length of stainless steel tube 2, of 9.5 mm diameter, forming part of a high-pressure hydraulic line intended for controlling the thrust reverser of the CFM 56 5C2 aircraft engine, said length of tube including no protective coating.

The second test specimen was formed by a length of tube 2, identical to that of the first test specimen but housed in a prefabricated silicone sleeve of 4 mm in thickness, in accordance with the known technique.

The third test specimen, in accordance with the present invention, included the same length of tube as the two first test specimens but was covered with a silicone coating 3 of 2.5 mm in thickness, itself being covered with a fibrous jacket of 1.5 mm in thickness. This fibrous jacket was formed by a braided sheet of ceramic fibers of 0.5 mm in thickness, this sheet being helically wound over the silicone coating 3 in three superposed layers with crosswinding.

The fourth test specimen, also in accordance with the present invention, was identical to the third test specimen, but included, in addition, an external silicone coating 6 of 1 mm in thickness.

Figure 3:
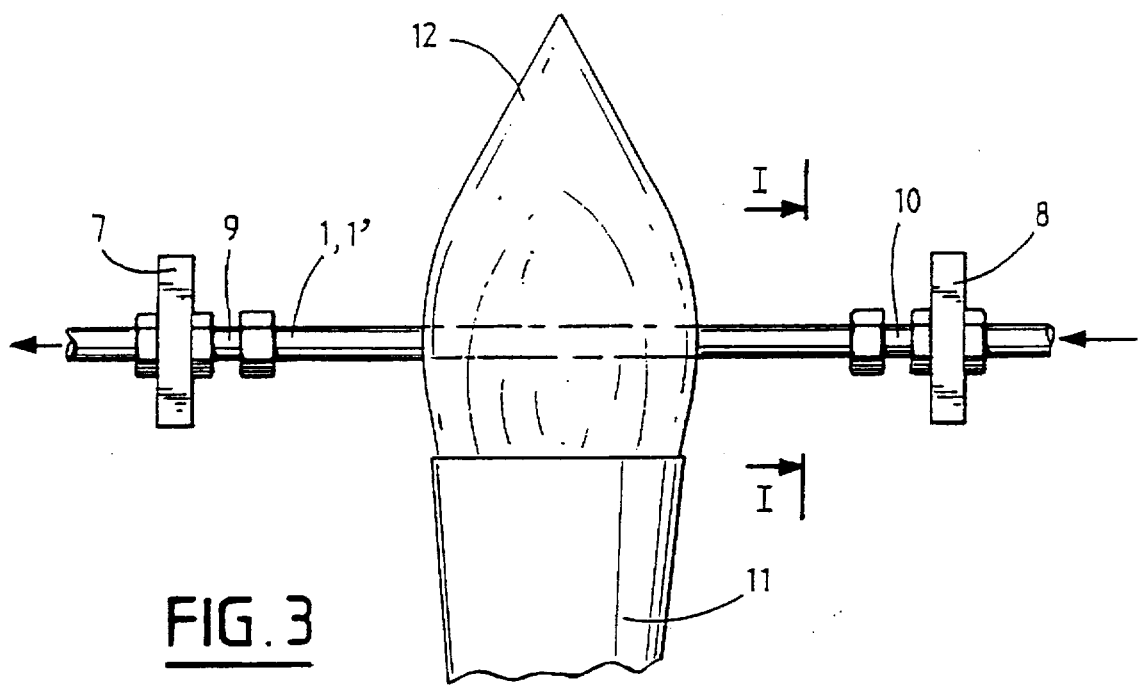
FIG. 3 is a plan view illustrating fire resistance tests to which the tubes of FIG. 1 or 2 have been subjected.

Each of the four test specimens was subjected to the test illustrated in FIG. 3, that is to say that it was connected at its ends to fittings 9 and 10, supported by columns 7 and 8, and supplying said tube 2 with a hydraulic fluid under a pressure of 206 bar, and that it was subjected to the flame 12 of a burner 11, said flame being at a temperature of 1100° C.

The first test specimen broke up after 6 min and the second after 9 min. In contrast, the third and fourth test specimens withstood 25 min of exposure to the flame 12, without breaking up.

We claim:

1. A method for the production of a silicone-based fireproof protection means (3, 4, 5), comprising:
   a) coating an object (2) to be protected with an unfilled silicone elastomer, which is in the form of a paste and adheres to said object (2);
   b) at least partially polymerizing the silicone elastomer, with which said object is thus coated; after which
   c) covering the at least partially polymerized silicone coating (3) thus obtained with a fire-resistant fibrous covering (5) which does not adhere to said silicone coating (3).

2. The method as claimed in claim 1, wherein said silicone elastomer is applied to said object (2) by spraying with a gun.

3. The method as claimed in claim 1, wherein the polymerization provided in step b) is a partial polymerization and wherein, after step c) for producing the fibrous covering, complete polymerization of said silicone coating (3) is carried out.

4. The method as claimed in claim 1, wherein the fibrous covering (5) is produced by helically winding a braided sheet of fire-resistant fibers on said silicone coating (3).

5. The method as claimed in claim 1, wherein, after producing the fibrous covering (5), said fibrous covering is coated, at least partially, with an unfilled silicone elastomer.

6. The method as claimed in claim 5, wherein said silicone elastomer is applied to said fibrous covering (5) by spraying with a gun.

7. The method as claimed in claim 5, wherein the polymerization provided in step b) is a partial polymerization and wherein, after coating said fibrous covering with an unfilled silicone elastomer, complete polymerization of the silicone coating covering said object and of the silicone coating covering said fibrous jacket is carried out.

* * * * *